United States Patent [19]
Creek

[11] 3,881,715
[45] May 6, 1975

[54] FIXTURE FOR HOLDING TUBE TURNS

[76] Inventor: Ellis E. Creek, 1100 North Sixth, Broken Arrow, Okla. 74012

[22] Filed: Sept. 7, 1973

[21] Appl. No.: 395,369

[52] U.S. Cl. ............... 269/45; 29/200 P; 269/131; 269/265; 269/321 N
[51] Int. Cl. ..................... B25b 1/20; B25b 11/02
[58] Field of Search ... 269/37, 41, 43, 45, 130–132, 269/104–106, 265, 321 N; 29/200 J, 200 P; 228/44, 48, 49

[56] References Cited
UNITED STATES PATENTS

| 260,396 | 7/1882 | Hunt | 269/45 |
|---|---|---|---|
| 1,848,527 | 3/1932 | Hickey | 269/131 |
| 1,928,892 | 10/1933 | Hickey | 269/131 |
| 2,817,892 | 12/1957 | Jones | 269/45 X |
| 2,932,995 | 4/1960 | Durfee | 269/321 N |
| 3,047,286 | 7/1962 | Kinne | 269/45 |
| 3,704,503 | 12/1972 | Haywood | 29/200 P |
| 3,776,539 | 12/1973 | Curtis | 269/45 X |

*Primary Examiner*—Roy Lake
*Assistant Examiner*—Neil Abrams

[57] ABSTRACT

A fixture or jig for holding tube turns during "fix up" prior to welding thereof during installation of the tube turn in a heat exchanger, or the like. The apparatus comprises means for clamping thereon on the open ends of adjacent or complementary tubes of the heat exchanger, said means also receiving the ends of the tube turn thereon in abutting relationship with the open ends of the respective tubes. Adjusting means is provided for closely aligning the open ends of the tube turn with the open ends of the respective tubes, and clamping means is provided for securely clamping the tube turn on the apparatus in said aligned position with the tubes for supporting the tube turn during a welding operation, or the like, for installating the tube turn on the tubes of the heat exchanger.

5 Claims, 4 Drawing Figures

PATENTED MAY 6 1975 3,881,715

FIXTURE FOR HOLDING TUBE TURNS

BACKGROUND OF THE INVENTION

1. Field of the Invention

This invention relates to improvements in holding jigs or fixtures and more particularly, but not by way of limitation, to a fixture for holding tube turns during installation thereof on heat exchangers, or the like.

2. Description of the Prior Art

Heat exchangers, and the like, normally comprise a plurality of plates or head members disposed in spaced relationship for supporting a plurality of substantially straight, mutually parallel tubes which comprise the body of the heat exchanger. The opposite ends of the tubes are usually open and communication is normally provided therebetween by welding or otherwise securing tube turn members to the open ends of adjacent tubes. These tube turns are usually 180° turns, but may be 90° turns, or turns of other angles.

In order to assemble or construct the heat exchanger, it is extremely important that the abutting ends of the straight tubes of the heat exchanger and the ends of the tube turn sections be closely aligned during the welding operation to assure an efficient connection therebetween. In order to achieve this, the common practice today requires two workmen. One workman may manually hold or support the tube turn in the aligned position thereof with the open ends of the straight tubes to which it is to be welded, and the other workman performs a tack welding operation for initially securing the tube turn to the tubes. Not only is the manual supporting of the tube turn an unwieldy and difficult task in that the alignment of the abutting ends is difficult, but also the welding operation may transmit a great quantity of heat to the tube turn which renders manipulation thereof even more difficult. In addition, the disadvantages of the requirement of two workmen will be apparent.

SUMMARY OF THE INVENTION

The present invention contemplates a novel jig or fixture for supporting tube turns during the installation or alignment thereof for fix up prior to welding thereof, and which is particularly designed and constructed for overcoming the foregoing disadvantages. The novel jig comprises a support bracket having a plurality of tube receiving elements adjustable secured thereon for clamping the apparatus to the open ends of the tubes to which the tube turn is to be attached. The tube turn may be securely clamped on the apparatus and adjusted for close alignment with the open ends of the tubes prior to the welding operation. The tube turn may then be supported on the apparatus during the welding operation. It will be readily apparent that the apparatus may be utilized by a single workman, and thus eliminates the need for two workmen normally required for the installation of tube turns.

The design of the novel jig lends itself to efficient use with tube turns of substantially any desired arcuate or angular configuration. For example, a jig for supporting a 180° tube turn may be provided with a substantially T-shaped support bracket having a pair of tube receiving elements on the outer extremities of the cross-bar portion of the Tee, and a tube turn receiving element provided on the outer extremity of the leg portion of the Tee. The distance between the tube receiving elements on the cross-bar may be adjusted according to the distance between the tubes of the heat exchanger, and the tube receiving elements may be securely clamped to the open ends of the tubes. The tube turn may be disposed in such a manner that the outer ends thereof are in abutment with the open ends of the tubes, and the position of the turn tube receiving element may be adjusted in accordance with the size of the tube turn whereby the central portion of the tube turn may be supported by the tube receiving element, and clamped securely therein. Adjustment means is provided on the tube receiving elements whereby the open ends of the tube turn may be closely aligned with the open ends of the respective tubes, and the support apparatus may then be utilized for securely holding the tube turn in the aligned position with the tubes during the welding operation.

In the event a 90° tube turn is to be utilized, the support bracket may comprise a single bar of an adjustable overall length, with mutually perpendicular tube receiving elements secured to the opposite ends thereof. The 90° tube turn may be readily positioned within the tube receiving elements and the tube receiving elements may be securely clamped to the open ends of the tubes to which the tube turn is to be attached. Adjustment means is provided on the tube receiving elements for facilitating a close alignment of the open ends of the tube turn with the open ends of the tubes, and the apparatus may be utilized for supporting the tube turn during the welding operation.

DESCRIPTION OF THE PREFERRED EMBODIMENTS

Figure 1:
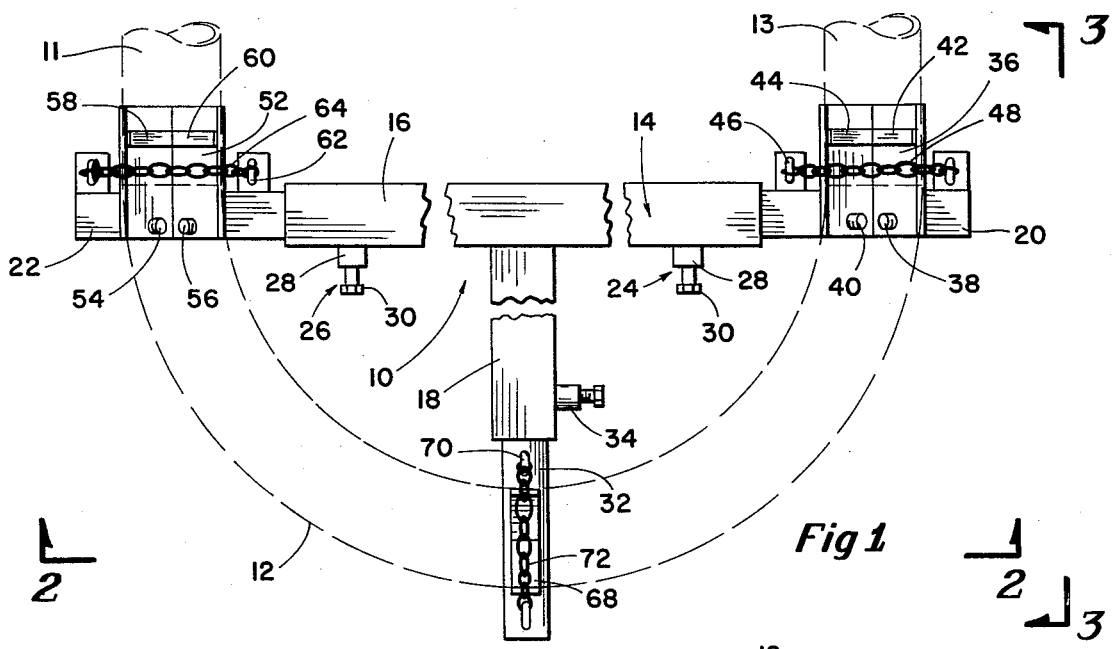
FIG. 1 is a broken plan view of a tube turn holding jig embodying the invention, with a 180° tube turn depicted in position against a pair of tubes as shown in dotted lines for purposes of illustration.
Figure 2:
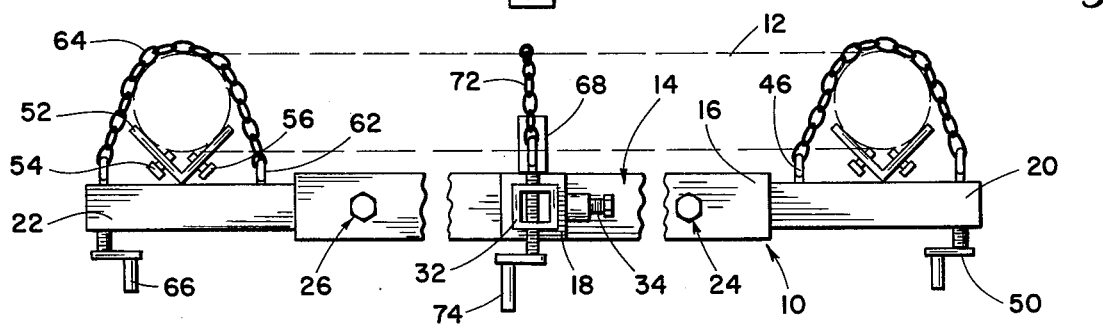
FIG. 2 is a broken elevational view taken on line 2—2 of FIG. 1.
Figure 3:
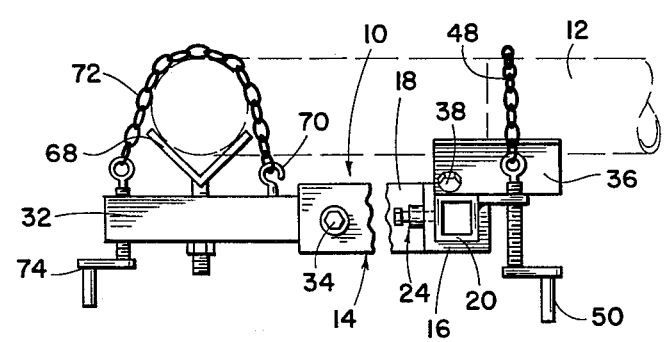
FIG. 3 is a broken elevational view taken on line 3—3 of FIG. 1.

Referring to the drawings in detail, and particularly FIGS. 1, 2 and 3, reference character 10 generally indicates a jig or fixture for holding a tube turn 12 (shown in dotted lines) in position against a pair of adjacent tubes 11 and 13 (shown in dotted lines) for a purpose as will be hereinafter set forth. The jig 10 is particularly arranged for supporting a 180° tube turn and the tube turn 12 shown in FIGS. 1, 2 and 3 is of the 180° type. However, it is to be understood that there is no intention of limiting the invention to any particular type tube turn.

The fixture 10 comprises a substantially T-shaped support bracket 14 including a cross-bar or cross-member 16 having a leg portion 18 secured to the central portion thereof in any well known manner (not shown) and extending substantially perpendicularly therefrom. The cross-bar 16 is preferably constructed from suitable tubing, such as the square tubing shown herein, but not limited thereto, having the opposite ends thereof open for slidably receiving oppositely disposed extension members 20 and 22 therein. Suitable locking means 24 is spaced from one end of the cross-bar 16 for selectively engaging the extension member 20 in order to lock the extension member 20 in substantially any desired position with respect to the cross-bar 16. A similar locking means 26 is spaced from the opposite end of the cross-bar 16 for selectively engaging the extension member 22 in order to lock the extension member 22 in substantially any desired position with respect to the cross-bar 16.

The locking means 24 and 26 may be of substantially any suitable or desired type, and as shown herein each may comprise an outwardly extending internally threaded boss member 28 secured to the outer periphery of the cross-bar 16 in alignment with an aperture (not shown) provided in the sidewall thereof, and a threaded stud 30 threadedly engaged with the boss 28. When it is desired to alter the position of the extension members 20 and 22 with respect to the cross-bar 16, the respective stud 30 or studs 30 may be "backed off" for disengagement with the respective extension member whereby the extension member may be readily moved inwardly or outwardly of the cross-bar 16. When the extension members 20 and 22 have been positioned as desired with respect to the cross-bar 16 the stud or studs 30 may be threaded inwardly in the respective bosses 28 for engagement with the outer periphery of the respective extension members in order to securely retain them in the preselected positions.

The leg member 18 is preferably constructed from a suitable material similar to the square tubing from which the cross-bar 16 is constructed, but not limited thereto. One end of the leg 18 is preferably rigidly secured to the outer periphery of the cross-bar 16, as hereinbefore set forth, and the outer end thereof is open for slidably receiving an extension member 32 therein which may be generally similar to the extension members 20 and 22. A locking device 34 which may be similar to the locking devices 24 and 26 is provided on the leg 18 for cooperating with the extension member 22 to securely lock the extension member 32 in substantially any desired position with respect to the leg member 18 as hereinbefore set forth.

The extension member 20 is provided with a substantially V-shaped support member 36 rigidly secured in the proximity of the outer end thereof in any well known manner (not shown) and extending substantially perpendicularly with respect thereto as particularly shown in FIG. 1 for receiving the end of one tube 13 and one end of the tube 12 in abutting relationship thereagainst, as will be hereinafter set forth, and as shown in dotted lines. One end of the support member 36 is provided with oppositely disposed adjustment members 38 and 40, which may be threaded bolts, or the like, having the inner ends thereof extending into the center portion of the support 36. The opposite end of the support 36 is preferably provided with a pair of oppositely disposed shims 42 and 44 for a purpose as will be hereinafter set forth.

A hook member 46, or the like, is secured to the extension member 20 in any suitable manner and is spaced slightly from one side of the support member 36 for removably receiving one end of chain or strap member 48. The opposite end of the chain 48 is suitably anchored in an adjustable jack 50, or the like, which is secured to the extension member in any well known manner and spaced slightly from the opposite side of the support 36 with respect to the hook 46. In this manner a clamping device is provided whereby the chain or strap 48 may be selectively disposed around the outer periphery of the tube 13 disposed in the support 36, with one end of the chain 48 engaged with the hook 46, and the tension of the chain 46 over the tube 13 being adjusted as desired by the jack 50. When the jack 50 is rotated in one direction, the chain 46 will be tightened around the tube 13, and when the jack 50 is rotated in an opposite direction, the tension of the chain 46 against the tube 13 will be loosened or released.

A substantial V-shaped support member 52 generally similar to the support 36 is rigidly secured to the extension member 22 in the proximity of the outer end thereof in any suitable manner (not shown) and is substantially perpendicular with respect thereto for receiving the end of the tube 11 and the opposite end of the tube turn 12 therein as shown in dotted lines. A pair of oppositely disposed adjustment elements 54 and 56 are provided on the support member 52 in the proximity of one end thereof, and may be threaded bolts, or the like, if desired, having the inner ends thereof extending into the interior or central portion of the support member 52. A pair of oppositely disposed shim members 58 and 60 may be disposed on the inwardly directed surfaces of the support member 52 in the proximity of the opposite end thereof with respect to the adjustment elements 54 and 56 for a purpose as will be hereinafter set forth. A hook 62, or the like, is suitably secured to the extension member 22 slightly spaced from one side of the support member 52 for removably receiving one end of a chain or strap member 62 thereon. The opposite end of the chain or strap 64 is suitably anchored to a jack 66, or the like, which is secured to the extension member 22 spaced from the opposite side of the support 52 in such a manner as to adjust the chain 64 whereby the chain 64 may be disposed around the outer periphery of the tube 11 for securely clamping the tube 11 within the support member 52.

A substantially V-shaped tube turn receiving or support element 68 is rigidly secured to the extension member 32 in the proximity of the outer end thereof and in any well known manner (not shown) for receiving the central portion of the tube turn 12 therein. The support element 68 is preferably of a shorter overall length than the support elements 36 and 52, and preferably does not extend beyond the lateral outer limits of the extension member 32, but not limited thereto. A suitable hook member 70, or the like, is secured to the extension member 32 spaced slightly from one side of the support member 68 for removably receiving one end of a chain or strap 72 thereon. The opposite end of the strap or chain 72 is suitably anchored to a jack 74, or the like, which is secured to the extension 32 slightly spaced from the opposite side of the support 68 with respect to the hook 70. The jack 74 may be used for adjusting the chain 72 when the chain is disposed around the outer periphery of the tube turn 12 disposed in the support 68 whereby the tube 12 may be securely clamped therein.

When it is desired to weld or otherwise secure the tube turn 12 to the open ends of the adjacent heat exchanger tubes 11 and 13, or the like, the device 10 may be adjusted in accordance with the distance between the tubes 11 and 13 for positioning the tube receiving or tube support members 36 and 52 in substantial alignment therewith. The extension members 20 and 22 may be manually reciprocated or moved with respect to the cross-bar 16 for positioning the tube support members 36 and 52 with the desired spacing therebetween, and the locking devices 24 and 26 may then be firmly set in engagement with the respective extension members 20 and 22 for securely locking the extension members in the preselected positions therefor. The extension member 32 may be then manually moved with respect to the leg 18 in accordance with the size of the tube turn 12 in order to receive the central portion thereof when the tube turn 12 is positioned on the supports 36 and 52 with the open opposite ends thereof in abutting relationship with the open ends of the tubes 11 and 13. The locking device 34 may be firmly set in engagement with the extension 32 for securely locking the extension in the preselected position therefor.

When the apparatus 10 is thus clamped to the ends of the tubes 11 and 13, the tubes 11 and 13 will preferably rest on the shims 58 and 60, and 42 and 44, respectively. The opposite ends of the tube turn 12 will be supported by the inwardly directed ends of the adjustment members 38, 40, and 54, 56. The adjustment members 38, 40, 54 and 56 may be manually manipulated by threading thereof inwardly and/or outwardly of the support members 20 and 52 for providing a fine adjustment for the position of the ends of the tube turn 12 resting therein. In this manner, the ends of the tube turn 12 may be closely aligned with the ends of the respective tubes 11 and 13. When the tube turn 12 has been properly aligned with the tubes 11 and 13, the apparatus 10 will securely support the tube turn in the aligned position during a tack welding operating, or the like, for initially securing the tube turn to the tubes. If desired, the apparatus 10 may then be removed from the clamped position with the tubes 11 and 13, and a final welding job may be performed for efficiently connecting the tube turn 12 to the tubes 11 and 13.

In order to remove the apparatus 10 from connection with the tubes 11 and 13, the pressure of chains 48 and 64 may be released or relieved by backing off the jacks 50 and 66, and the chains 48 and 64 may be released from the engagement with the hooks 46 and 62, respectively. Similarly, the tension or pressure of the chain 72 may be relieved by backing off the jack 74 and releasing the engagement of the chain 72 with the hook 70. The apparatus 10 may then be readily removed from the tubes 11 and 13, and from the tube turn 12 which has been secured or attached to the tubes.

Figure 4:
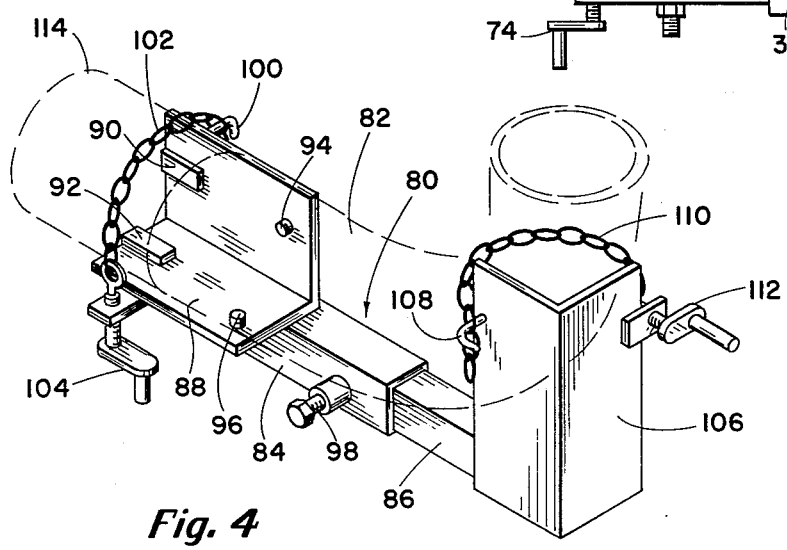
FIG. 4 is a perspective view of a modified tube turn holding jig embodying the invention, with a 90° tube turn depicted therein in dotted lines for purposes of illustration.

Referring now to FIG. 4, reference numeral 80 generally indicates a jig or fixture for supporting a 90° tube turn 82 (shown in dotted lines). The fixture 80 comprises a substantially straight holding member 84 preferably constructed from suitable tubing, such as the square tubing shown herein. The holding member 84 has at least one open end for slidably receiving an extension member 86 therein. A first support member 88 of a substantially L-shaped configuration is rigidly secured to the outer periphery of the holding member 84 in any well known manner (not shown). Whereas the support member 88 as shown in FIG. 4 is of a reversed L-shaped configuration, it is to be understood that the support 88 may be conventional L-shaped configuration, if desired.

A pair of suitable shims 90 and 92 are provided on the inner surfaces of the support 88 in the proximity of the outer end thereof, and a pair of oppositely disposed adjustment members 94 and 96 are provided in the proximity of the opposite end thereof. The adjustment members 94 and 96 may be of any suitable type, and as shown herein each comprises a threaded bolt member having the inner end thereof extending into the interior or central portion of the support 88 for a purpose as will be hereinafter set forth. A locking device 98 is provided on the holding member 84 for selective engagement with the extension member 86 in order to securely lock the extension member 86 is substantially any desired telescopic position with respect to the holding member 84. The locking device 98 may be of any suitable type, and as shown herein is generally similar or substantially identical to the locking devices 24, 36 and 34.

A hook member 100, or the like, is secured to one side of the support member 88 in any suitable manner for removably receiving one end of a chain or strap member 102 thereon. The opposite end of the chain 102 is suitably anchored to a jack 104, or the like, which is secured to the opposite side of the support member 88 in any well known manner.

A second support member 106 of a substantially L-shaped configuration, is rigidly secured to the outer extremity of the extension member 86 in any well known manner (not shown) and is disposed perpendicularly with respect to the support member 88 as clearly shown in FIG. 4. A suitable hook member 108 is secured to one side of the support member 106 in the proximity of the outer end thereof for removably receiving one end of a chain or strap member 110 thereon. The opposite end of the chain 110 is suitably anchored to a jack 112, or the like, which is suitably secured to the opposite side of the support member 106.

The apparatus 80 may be secured to a tube 114 (shown in dotted lines) by placing the outer end of the tube 114 in the support member 88 in the proximity of the shim members 90 and 92, and engaging the outer periphery of the tube 114 with the chain 102. The tension or pressure of the chain 102 may be increased as desired by manipulation of the jack 104 in the well known manner in order to securely clamp the apparatus 80 on the tube 114. The 90° tube turn 82 may then be positioned on the fixture 80 with one open end thereof in abutment with the open end of the tube 114, and with the outer periphery thereof resting on the adjustment members 94 and 96. The locking means 98 may be released whereby the position of the support member 106 may be adjusted in accordance with the overall size of the tube turn 82 by moving the extension member 86 until the support member 106 is in a position for receiving the opposite end of the tube turn 82 therein. The locking device 98 may then be firmly set in position against the outer periphery of the extension member 86 for securely retaining the extension member in the preselected position therefor. The chain 110 may be disposed around the outer pierphery of the tube turn 82, and the tension of the chain 110 may be properly adjusted by the manipulation of the jack 112 for securely clamping the tube turn 82 in the support member 106.

The tube turn 82 may then be tack welded, or the like, to the tube 114 in the usual or well known manner (not shown). Subsequent to the tack welding operation, the apparatus 80 may be removed from engagement with the tube 114 and tube turn 82 by releasing the chains 102 and 110 from the respective hooks 100 and 108 in the manner as hereinbefore set forth.

From the foregoing it will be apparent that the present invention provides a novel fixture or jig for supporting or holding tube turns during fix up thereof in connection with the tubes of a heat exchanger, or the like, and prior to the completed welding operation of the tube turn with the heat exchanger tubes. The novel apparatus may be easily clamped to the outer open ends of the tubes and efficiently support a tube turn in close alignment with the open ends of the tubes during an initial tack welding operation, or the like, subsequent to which the apparatus may be removed for precluding interference with the completion of the welding operating. The novel apparatus facilitates the installation of tube turns in heat exchangers, and the like, by permitting the attachment of the tube turns by a single workman, thus not only reducing the labor required but also reducing the cost of installation. The novel apparatus is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

I claim:

1. A fixture for holding tube turns during "fix up" prior to welding thereof to complementary tube means and comprising support bracket means, longitudinally adjustable substantially V-shaped tube receiving means secured to the support bracket means for receiving the tube means therein, clamping means secured to the tube receiving means for clamping the tube receiving means to the tube means therein, longitudinally adjustable substantially V-shaped tube turn receiving means secured to the support bracket means and cooperating with the tube receiving means for supporting the tube turn with the opposite ends thereof simultaneously in end to end abutment with the tube means, and clamping means provided on the tube turn receiving means for clamping the tube turn on the apparatus in said abutting relationship with the tube means, each of said V-shaped tube receiving members having shim members provided in the proximity of one end thereof for receiving a tube thereagainst, and each of said V-shaped tube receiving members having adjusting means provided at the opposite end thereof for engagement with the tube turn for adjusting the relative position thereof with respect to the respective tube member disposed in said V-shaped tube receiving member.

2. A fixture as set forth in claim 1 wherein the support bracket means comprises holder means, extension means slidably secured to the holder means and secured to said tube turn receiving means for adjustably securing said tube turn receiving means to the support means, and locking means cooperating between the holder means and extension means for locking the extension means in substantially any desired position with respect to the holder means.

3. A fixture as set forth in claim 1 wherein the clamping means comprises hook means, jack means, and strap means having one end removably engagable with the hook means and the opposite end thereof anchored to said jack means whereby the pressure of the strap means may be selectively adjusted.

4. A fixture as set forth in claim 1 wherein the support bracket means comprises a holder member having the tube receiving means secured thereto, an extension member slidably secured to the holder member and having said tube turn receiving means secured thereto for adjustably securing said tube turn receiving means to the support bracket means, and locking means cooperating between the holder member and the extension member for locking the extension member in substantially any desired position with respect to the holder member.

5. A fixture for holding tube turns during fix up prior to welding thereof to complementary tube means and comprising support bracket means, tube receiving means adjustably secured to the support bracket means for receiving the tube means therein, clamping means secured to the tube receiving means for clamping the tube receiving means to the tube means therein, tube turn receiving means adjustably secured to the support bracket means and cooperating with the tube receiving means for supporting the tube turn in end to end abutment with the tube means, and clamping means provided on the tube turn receiving means for clamping the tube turn on the apparatus in said abutting relationship with the tube means, said support bracket means comprising a substantially T-shaped holder member, first extension means slidably secured to the cross-bar member of the Tee and having said tube receiving means secured thereto for adjustably securing said tube receiving means to the support bracket means, second extension means slidably secured to the leg member of the Tee and having the tube turn receiving means secured thereto for adjustably securing said tube turn receiving means to the support bracket means, and locking means cooperating between the holder member and the extension members for locking the extension members in substantially any desired position with respect to the holder member, said tube means comprising a pair of spaced open ended tubes, and the tube receiving means comprising a pair of oppositely disposed substantially V-shaped tube receiving members, each of said V-shaped tube receiving members having shim members provided in the proximity of one end thereof for receiving a tube thereagainst, and each of said V-shaped tube receiving members having adjusting means provided at the opposite end thereof for engagement with the tube for adjusting the relative position thereof with respect to the respective tube member disposed in said V-shaped tube receiving member.

* * * * *